United States Patent [19]

Holt

[11] 4,258,968
[45] Mar. 31, 1981

[54] GENERATOR ADAPTOR

[76] Inventor: Kenneth M. Holt, 1623 River Rd. NW., East Grand Forks, Minn. 56721

[21] Appl. No.: 29,786

[22] Filed: Apr. 13, 1979

[51] Int. Cl.³ .............................................. H01R 11/00
[52] U.S. Cl. ................................ 339/14 L; 339/113 L; 339/154 A
[58] Field of Search ................... 361/369, 372; 307/43, 307/64, 86; 339/113 R, 155 RJ, 14 L, 184 M, 113 L, 154 A

[56] References Cited

U.S. PATENT DOCUMENTS

| 2,863,038 | 12/1958 | Lombardo | 174/59 |
|---|---|---|---|
| 3,202,977 | 8/1965 | Sims | 361/372 X |
| 3,503,062 | 3/1970 | Witzke et al. | 307/287 |
| 3,641,545 | 2/1972 | Okada | 340/248 B |
| 3,643,209 | 2/1972 | Coston | 339/155 R |
| 3,654,484 | 4/1972 | Jorgensen et al. | 361/369 |
| 3,962,630 | 6/1976 | Chaffee | 324/51 |

*Primary Examiner*—John McQuade
*Attorney, Agent, or Firm*—Dorsey, Windhorst, Hannaford, Whitney & Halladay

[57] ABSTRACT

A generator adaptor has a body portion with one or more sets of stab terminals for insertion in the socket terminals of a standard electric meter receptacle to connect the adaptor in place of a regular meter unit during a power failure in a primary electric supply line. The adaptor has one set of such stab terminals positioned for insertion in a corresponding set of socket terminals in the meter receptacle which are connected to the normal outgoing load lines from the meter receptacle. The adaptor has an auxiliary electric supply line with wires which are connected at one end to this one set of stab terminals and which have connecting terminal portions at their other ends for connection to an auxiliary power source such as a stand-by generator. The adaptor construction prevents any current-transmitting connection from the incoming primary supply lines to the socket terminals connected to the outgoing load lines. The adaptor also has a second set of stab terminals for insertion in another corresponding set of socket terminals in the meter receptacle which are normally connected to incoming primary electric supply lines from a public utility. The adaptor includes a signal unit connected to the second set of stab terminals providing a signal responsive to availability of electric current in such incoming primary supply lines.

10 Claims, 4 Drawing Figures

GENERATOR ADAPTOR

FIELD OF THE INVENTION

The invention relates to devices for connecting an auxiliary electric power source to the load lines of an electrical installation during periods of emergency, when there is a power failure or cut-off in the normal incoming electric supply lines from a public utility or other primary power source.

DESCRIPTION OF THE PRIOR ART

Auxiliary electric power generators have long been made and sold for various applications. Such generators are combined with internal combustion engines for use as stand-by generators during primary electric power interruptions. In some cases, switching devices are installed as relatively permanent elements of a customer installation for connecting such stand-by generators into the load during these interruptions. Manual switching devices are available, as well as automatic devices which may not only connect the stand-by generator, but may also start it automatically in response to a primary power interruption. Such devices are effective, but their costs, including both equipment and installation costs, are often greater than an average user is willing to spend. It may also be difficult to obtain immediate emergency services of a trained installer, if such a device has not been installed as a precautionary measure well before any emergency arises.

SUMMARY OF THE INVENTION

The present invention provides an improved adaptor for selective connection of an auxiliary electric power source, such as a stand-by generator, to the load lines of a particular individual electrical installation, so that the load lines can be energized during interruptions of power normally supplied through the incoming primary electric supply lines from a public utility. The improved adaptor is constructed for convenient insertion in place of a normal electric meter unit, by removal of such meter unit from its standard meter receptacle and by insertion of the adaptor in place of such meter. The standard meter receptacle has a set of forwardly facing load socket terminals connected to the load line and a similar set of forwardly facing supply socket terminals connected to the primary incoming supply lines. A normal electric meter unit received in such a receptacle is provided with corresponding rearwardly projecting stab terminals for connecting the supply and load lines to each other through the meter unit, in order that the meter can measure and record the current which is drawn by the local load from the primary supply.

The improved adaptor of the present invention provides at least a first set of rearwardly projecting stab terminals adapted to fit the load socket terminals of the meter receptacle when the adapter is positioned in the meter receptacle in place of the normal meter unit. The adaptor has an auxiliary electric supply line for connection to an auxiliary electric power source, and this auxiliary supply line has supply wires respectively connected at one end to the first stab terminals for connection thereby to the load socket terminals and load lines. The supply wires of the auxiliary electric supply line also have connecting terminal portions at their other ends for connection to a desired stand-by electric generator or other auxiliary source. To prevent unauthorized use of power from the primary electric supply line when the meter is removed, and to prevent any feedback from such an auxiliary power source to the primary electric supply lines, the adaptor has a construction preventing any current transmitting connection from the meter receptacle supply socket terminals to the first set of adaptor stab terminals, while the adaptor terminals are connected to the respective meter receptacle terminals.

The preferred adaptor of the present invention also has a second set of rearwardly projecting stab terminals adapted to fit the load socket terminals of the meter receptacle. The preferred adaptor also has a signal unit connected to at least one of the stab terminals of the second set, with the signal unit providing a suitable indication responsive to availability of electric current when power is restored in the incoming electric supply lines. The signal unit and second set of stab terminals are supported and connected in the adaptor in such a way as to prevent any undesired current transmitting connection between the meter receptacle supply sockets and the meter receptacle load sockets.

The adaptor can be constructed by using standard parts of a meter unit, with the metering elements removed and replaced by the desired connections for the present invention. Thus the standard stab terminals and base assembly of such a unit can be used to provide terminal strip portions within the adaptor to which the desired auxiliary power supply line and signal unit connections can be made. Even the transparent relatively unbreakable cover member of such a meter unit can be used with a signal unit which includes an electric bulb or other visible indicator and with the addition of an inlet opening and fitting in the transparent cover through which the auxiliary electric supply line can be connected to the appropriate terminals within the adaptor body and cover.

Further features and details of the present invention will be apparent from the following detailed description of a preferred embodiment.

BRIEF DESCRIPTION OF THE DRAWINGS

In the drawings which form a part of this application, and in which like reference characters indicate like parts.

DESCRIPTION OF THE PREFERRED EMBODIMENT

Figure 1:
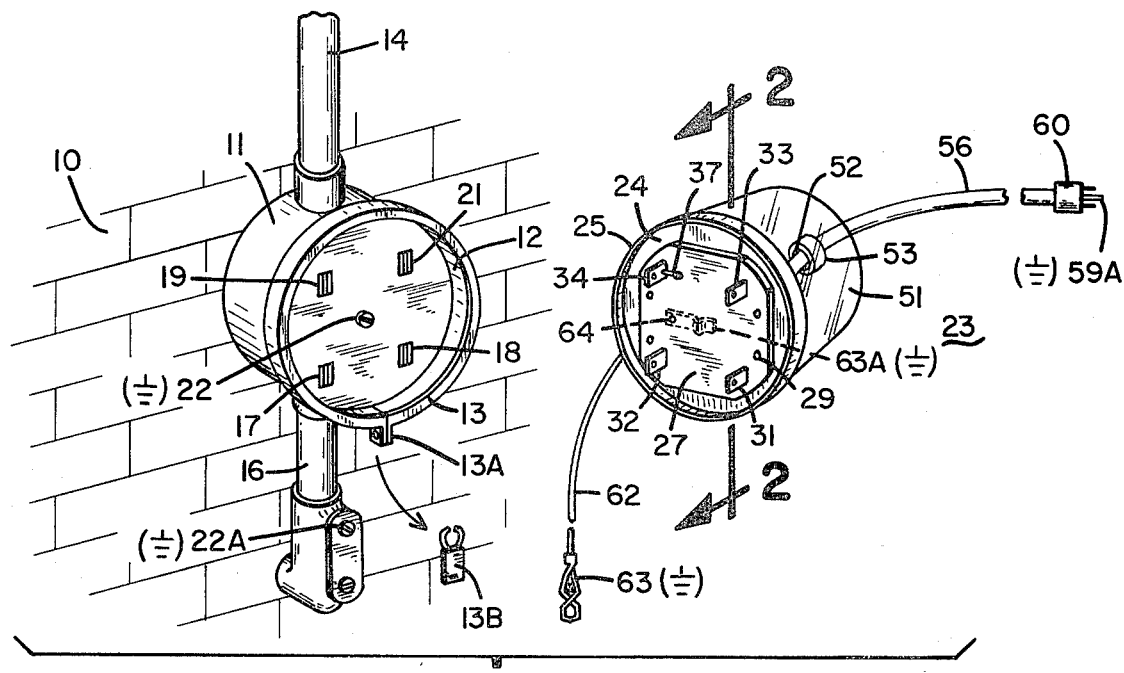
FIG. 1 is a partial perspective view of a normal meter receptacle at an individual building installation, with an adaptor according to the present invention in position prior to insertion in such receptacle.

As shown in FIG. 1, the adaptor of the present invention is designed for use in connection with an individual installation in which an inner or outer wall area 10 supports a normal electric meter receptacle 11. The receptacle has an annular rim portion 12. A clamping ring 13 of channel cross section normally engages the rim 12 as well as a corresponding rim on an electric meter unit and thereby holds such a meter unit in operating position in the socket of receptacle 11. Clamping ring 13 has end flanges 13A which are normally wired together in assembled position and held by a suitable seal 13B.

The incoming power lines from a primary electric supply source, such as a public utility, are led to the meter receptacle 11 through a supply conduit or line 14. After the current has been fed through the normal meter unit, it is then fed to a load or output line indicated generally at 16, which is suitably connected to electrical outlets, lights, appliances or other electric devices at the individual installation. Meter receptacle 11 has a set of load socket terminals 17, 18 connected to the output supply line 16. The meter receptacle also has a set of supply socket terminals 19, 21 connected to the incoming supply line 14.

The usual metering unit (not shown) has a base portion provided with corresponding sets of stab terminals for insertion in the socket terminals 17, 18, 19 and 21. Such a metering unit thus normally connects the load socket terminals 17, 18 electrically to the supply socket terminals 19, 21 in a manner which insures metering of the current passing from the supply to the load. The meter receptacle also includes a common ground point, e.g. screw 22, connected to the supply and load ground lines, such as a grounded part 22A of the load line.

The generator adaptor of the present invention is shown generally at 23 in FIG. 1. It has a body portion comprising a metal base plate 24 having an annular rim 25 essentially identical to the corresponding rim of the normal metering unit. Thus rim 25 can fit with the rim 12 of the meter receptacle 11 and be engaged and retained in assembled portion by the channel shaped clamping ring 13 with a temporary connection at 13A. Base plate 24 also has a central opening 26 (FIG. 2) into which a portion of insulating support plate 27 may be inserted. Insulating plate 27 can be held in assembled position with metal base plate 24 by rivets 29 or other connections, so that the rearwardly facing surface of plate 27 overlaps and is sealed to metal base plate 24 and serves as an insulating support for appropriate stab terminals on the adaptor.

Thus rearwardly projecting stab terminals 31 and 32 constitute a first set of such terminals adapted to fit the respective load socket terminals 17 and 18 when the adaptor is assembled in the meter receptacle 11. A second set of stab terminals 33 and 34 are also provided in the preferred form of the invention for insertion in the power supply socket terminals 19 and 21 respectively.

The insulating support 27, 28 is provided with appropriate slits or openings 36 through which the stab terminals may be mounted by inserting them from the forward portion 28 of the insulating plate until they project the desired distance rearwardly of plate 27 for engagement with the socket terminals of the meter receptacle. The stab terminals have openings in which cotter pins or other retaining members 37 can be inserted to hold the stab terminals in assembled position by preventing their inadvertent removal in a forward direction through the openings 26. To determine the rearward location or position of the stab terminals, each stab terminal has a connecting terminal strip portion which extends laterally across at least part of the forward surface of insulating plate 28 and provides both a limiting stop for rearward movement of the stab terminals, as well as a convenient terminal type of connection for the remaining parts of the adaptor.

Figure 2:
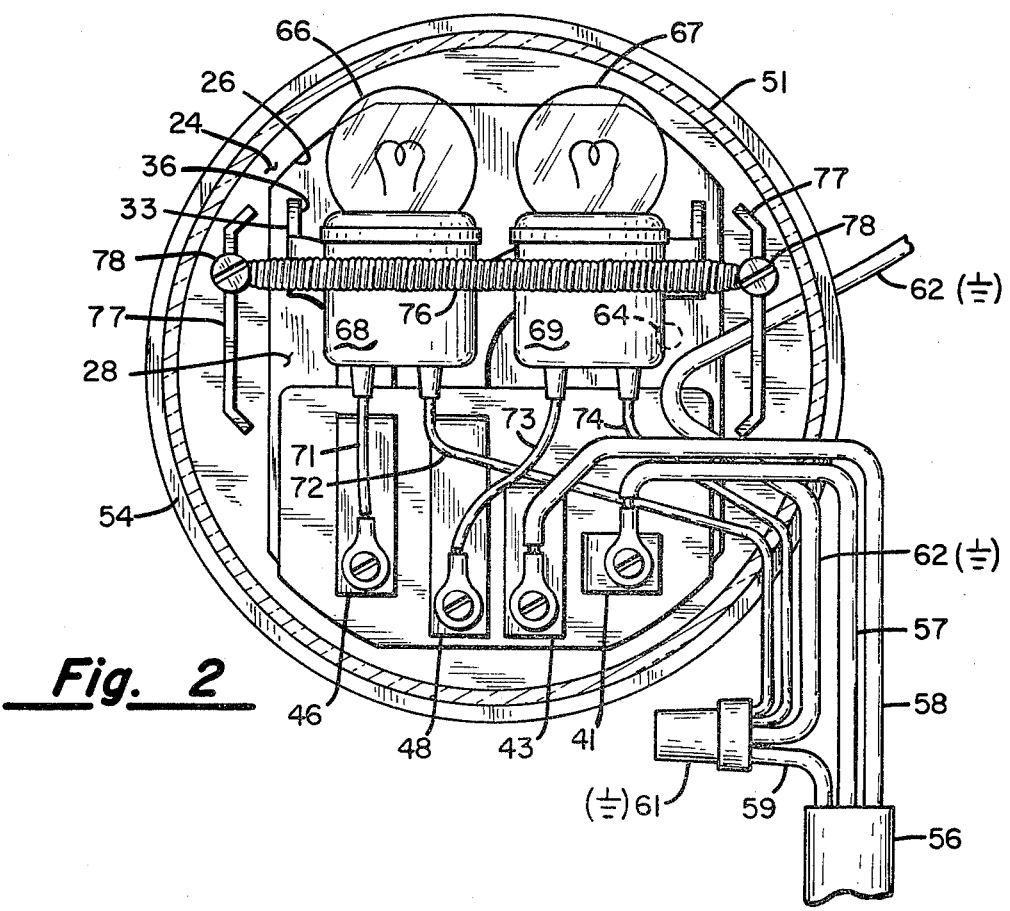
FIG. 2 is a partial sectional view of the front of the adaptor, taken on the lines 2—2 of FIG. 1.
Figure 3:
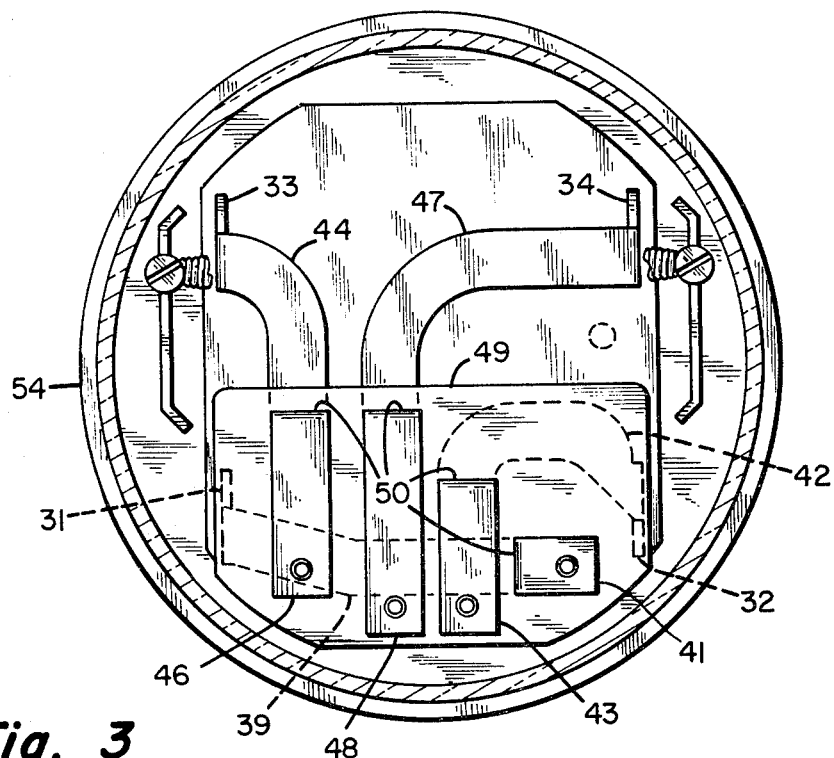
FIG. 3 is a view similar to FIG. 2, with the signal unit and wiring details removed to show the construction of the terminal strip portions which extend from the respective stab terminals of the adaptor.

These connecting and conducting terminal strip portions are shown particularly in FIGS. 2 and 3. Specifically, stab terminal 31 has a conducting strip 39 extending across insulating portion 28 to a terminal 41. Stab terminal 32 has a lateral conducting strip 42 extending to a terminal point 43. Stab terminal 33 has a conducting strip 44 extending to its terminal point 46, and stab terminal 34 has a conducting strip 47 ending at a terminal point 48.

To hold the various terminal strips in appropriate position and maintain them in appropriate insulated relationship with respect to each other, an upper insulating plate 49 is also provided. This plate has appropriate slots or openings 50 through which portions of the conducting strips from the stab terminals may be offset upwardly for accessibility along the top surface of insulating plate 59 in the manner of a regular terminal strip for connections 41, 43, 46 and 48. The described arrangement is such that the terminal strip portions and insulating plate 49 can be assembled in a preliminary step and the stab terminals can then be inserted in the openings in insulating plate 27, 28 and the retaining pins 37 then placed in the stab terminals to maintain all of these parts in assembled position. Suitable grooves in the respective surfaces of insulating portion 28 and insulating plate 49 may also be provided to insure the holding of the parts in the desired relative positions, fully insulated from each other.

The adaptor has a cover 51 of relatively unbreakable transparent material such as the normal transparent cover of a regular meter unit. Cover 51 is provided, however, with a central opening 52 in which an inlet fitting 53 can provide a strain relief connection for an auxiliary generator cord 56. Cover 51 also has a projecting base flange 54 adapted for appropriate clamping engagement with retaining portions on the base plate 24.

Generator cord 56 serves as an auxiliary electric supply line which has two current transmitting wires 57 and 58 connected to the respective terminal portions 41 and 43 and thereby electrically connected to the stab terminals 31 and 32, and through them to the load socket terminals 17 and 18 when the adaptor is assembled in the meter receptacle 11. The auxiliary supply line also includes a ground wire 59 connected to a common ground connection point 61 within the adaptor. The adaptor itself includes a grounding means for selectively connecting the ground wire of the auxiliary electric supply line to a common ground portion of the meter receptacle and supply and load lines. One such grounding means comprises an extension ground wire terminal portion 62 which is also connected to the common ground point 61 and extends outwardly through the side of the adaptor, with a resilient clamp or other suitable connection 63 at its outer end. Clamp 63 is adapted for connection to a common ground point, such as 22A of the load and supply lines.

A possible alternate grounding connection for wires 59 and 62 is shown in dotted outline in FIG. 1 as a terminal strip on the rear surface of plate 27. This strip has a spring contact terminal portion 63A located to engage the grounded screw 22, when the adaptor is in the meter receptacle. The strip includes a connecting portion accessible through an opening at 64 in plate 27, for optional direct connection to wire 62 and/or ground point 61 within the adaptor. The adaptor may be constructed with both types of grounding means as shown in FIG. 1 or with only one or the other of them.

The supply wires of the auxiliary electric supply line 56 have connecting terminal portions at their other ends, remote from the adaptor for connection to a stand-by generator or other auxiliary electric power source. These connecting terminal portions are provided in a suitable connecting plug 60 to fit a generator output receptacle. For example, terminal portion 59A of ground wire 59 will fit the usual ground socket of the generator output.

The adaptor 23 preferably includes a signal unit connected to at least one of the stab terminals 33 and 34 to provide a suitable signal responsive to availability of electric current in the incoming electric supply line socket terminals 19 and 21 of the meter receptacle 11. Thus the user who has mounted adaptor 23 in meter receptacle 11 upon the occurance of a power interruption will know when the power has been restored, so that the stand-by generator can be shut off, the adaptor removed, and the regular meter unit installed in its receptacle 11.

The signal unit is shown as a pair of electric lamp bulbs 66 and 67 in sockets 68 and 69. Socket 68 has electrical leads 71 and 72 connected respectively to terminal portion 46 of stab terminal 33 and to the common ground point 61. Socket 69 has simliar electrical leads 73 and 74 connected respectively to terminal portion 48 of socket terminal 34 and to the common ground point 61.

The sockets 68 and 69 of the signal unit are held in position by a retaining spring 76 which extends across the forward surfaces of the sockets and has its ends connected to supporting posts 77 by bolts 78.

Figure 4:
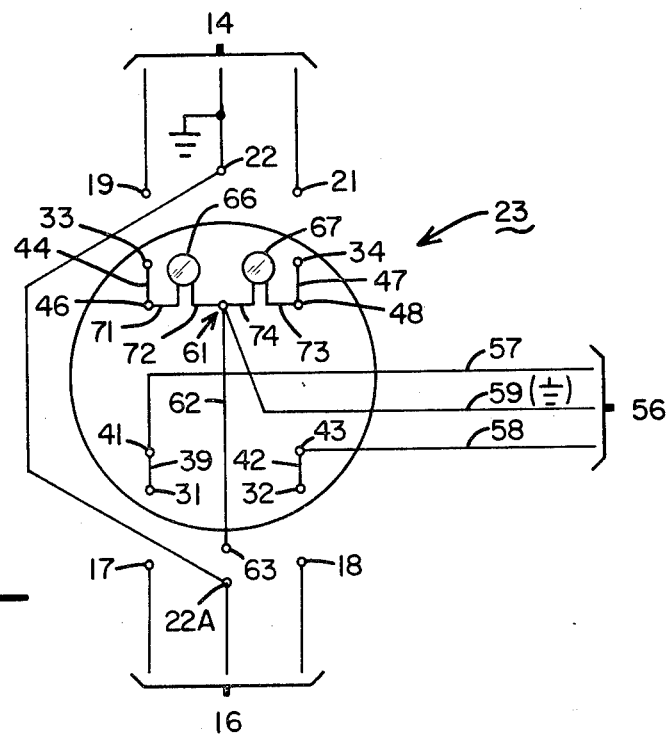
FIG. 4 is a schematic diagram showing the circuit connections of the adaptor and the manner in which they are connectable to the meter receptacle socket terminals.

As further shown in FIG. 4, the arrangement of parts is such that the adaptor construction prevents any current-transmitting connection from the meter receptacle supply socket terminals 19 and 21 to the adaptor stab terminals 31 and 32 which are adapted for insertion in the meter receptacle load or output socket terminals 17 and 18. Thus there is no possibility of unauthorized feeding of electric current from supply line 14 to load line 16 while the meter is removed or while the adapter 23 is mounted in the meter receptacle 11. By the same token, there is no possibility of feedback from the auxiliary generator or supply line 56 to the incoming primary supply line 14 through meter receptacle supply socket terminals 19 and 21.

As shown particularly in FIGS. 2 and 3, the adaptor 23 is constructed of a number of parts, such as the base plate, cover, insulating support plate and auxiliary insulating plate, and stab terminals with laterally extending and partially offset connecting terminal strip portions and removable retaining members, which comprise standard parts identical to those used as corresponding parts of some commercially available meter units of the type normally supported in such a meter receptacle. Thus the adaptor of the present invention can be assembled economically from commercially available parts without the necessity of designing and manufacturing a complete set of special separate parts for such adaptors. The invention can be practiced, however, with non-standard parts, if the costs of parts, assembly and maintenance of a different form of construction should prove advantageous.

The adaptor of the present invention has a switch-free construction in which the mounting of the adaptor itself into a meter receptacle in place of the normal meter unit provides the sole switching action disconnecting the primary electric supply line from the load socket terminals of the meter receptacle and connecting the auxiliary electric supply line to such load socket terminals. The adaptor parts also have a construction and relative location preventing electrical connection of such normal meter unit with any of the electric supply and load socket terminals of the meter receptacle while the adaptor stab terminals engage such socket terminals.

The invention described herein provides an improved adaptor which can be readily connected to the meter receptacle of a normal electrical installation in place of the regular electrical meter unit, whenever there is an interruption of the primary electrical supply from a public utility line or the like. The adaptor can be manufactured economically and stocked by suppliers or customers for immediate and convenient use by customers whenever there is a substantial power interruption to require the use of auxiliary power sources. The foregoing specification sets forth certain preferred embodiments and modifications of the invention and some of the ways in which the invention may be put into practice, including the best mode presently contemplated by the inventor for carrying out this invention. Modifications of the described embodiment, as well as alternate embodiments and devices for carrying out the invention may also be apparent to those skilled in the art, within the spirit and scope of the following claims:

We claim:

1. An improved adaptor for selective connection of an auxiliary electric power source to a meter receptacle of a type normally connected between the supply and load lines of a primary electric system, in which the meter receptacle includes a set of forwardly facing load socket terminals connected to the load lines and a set of forwardly facing supply socket terminals connected to the primary incoming electric supply lines, and in which said socket terminals normally receive corresponding rearwardly projecting stab terminals of an electric meter unit for connecting the primary supply and load lines to each other through said meter unit, said adaptor comprising a first set of rearwardly projecting stab terminals adapted to fit the load socket terminals of the meter receptacle and a second set of rearwardly projecting stab terminals adapted to fit the meter receptacle supply socket terminals for selective mounting of the adaptor in such meter receptacle in place of such an electric meter unit when the unit has been removed, said adaptor having an auxiliary electric supply line with supply wires respectively connected at one end to said first stab terminals for connection thereby to said load lines, the supply wires of said auxiliary electric supply line having connecting terminal portions at their other ends for connection to an auxiliary electric power source, said adaptor having a construction preventing any current transmitting connection from the meter receptacle supply socket terminals to the first set of adaptor stab terminals while the adaptor terminals are connected to the meter receptacle terminals, and said adaptor also having a signal unit connected to at least one of the stab terminals of the second set, the signal unit providing a signal responsive to availability of electric current in the incoming electric supply lines.

2. An adaptor according to claims in which the signal unit comprises an electric lamp.

3. An adaptor according to claim 1 in which the supply wires of the auxiliary electric supply line of the adaptor include a ground wire having a connecting terminal portion for grounding connection to such auxiliary electric power source, the adaptor having grounding means for selectively connecting said ground wire to a grounded portion of one of such supply and load lines and meter receptacle when the adapter is selectively connected to the meter receptacle.

4. An adaptor according to claim 3 for use with electrical primary supply and load lines which each include two current transmitting wires connected to the respective socket terminals and a further ground wire connected to provide a common ground connection point at the meter receptacle, and in which the adaptor grounding means comprises a ground terminal portion separate from the stab terminals for selective connection to the common ground connection point at such meter receptacle, the auxiliary supply line of the adaptor also having two current transmitting wires connected to the first set of stab terminals and having its ground wire connected to the ground terminal portion.

5. An adaptor according to claim 4 having an electric signal lamp connected between the adaptor ground wire and one of the stab terminals of the second set.

6. An adaptor according to claim 5 having an additional electric signal lamp connected between the adaptor ground wire and another stab terminal of the second set.

7. An adaptor according to claim 1 in which the adaptor has a body portion comprising an insulating support plate with spaced openings through which the respective stab terminals project rearwardly and are insulated from each other, each stab terminal having a connecting terminal strip portion extending laterally from its opening in an area forwardly of the support plate and thereby limiting rearward relative movement of the stab terminal with respect to the plate, and each stab terminal having a selectively removable retaining member rearwardly of the support plate normally preventing forward relative movement of the stab terminal with respect to the plate, selective removal of such retaining members permitting selective disassembly and assembly of the stab terminals by respective forward removal and rearward insertion of the stab terminals with respect to the support plate openings, the supply wires of the auxiliary electric supply line being removably connected to the respective terminal strip portions of the first set of stab terminals, and the signal unit having electric leads removably connected to at least one terminal strip portion of the second set of stab terminals.

8. An adaptor according to claim 7 in which the insulating plate of the adaptor body portion, the stab terminals and their connecting terminals strip portions, and the removable retaining members comprise standard parts identical to those used as corresponding parts of a commercially available meter unit of the type normallly supported in such a meter receptacle.

9. An adaptor according to claim 1 having a switchfree construction in which the mounting of the adaptor itself into such a meter receptacle in place of a normal electrical meter unit provides the sole switching action disconnecting the primary electric supply line from the load socket terminals of the meter receptacle and connecting the auxiliary electric supply line to such load socket terminals.

10. A switchfree adaptor according to claim 1 in which the auxiliary electric supply line and the terminal connections between the adaptor and such meter receptacle have a construction and relative location preventing electrical connection of such normal meter unit with any of the electric supply and load socket terminals of such meter receptacle while the adaptor stab terminals engage such socket terminals.

* * * * *